Figure 1:
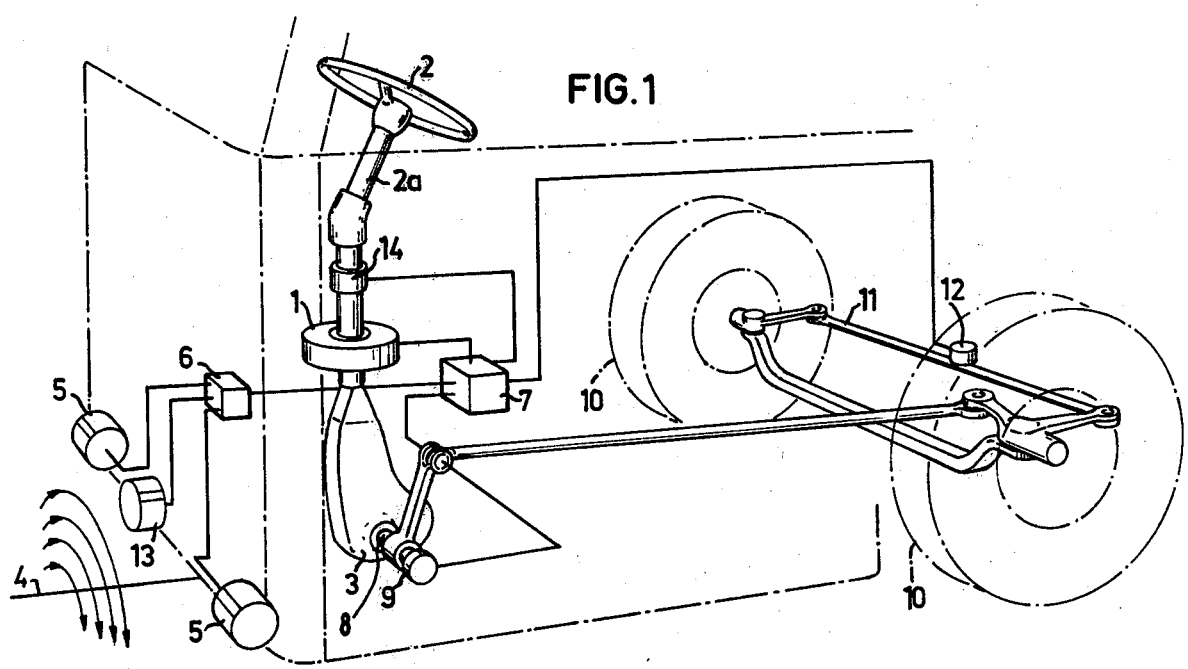

United States Patent [19]

Otteblad et al.

[11] 4,176,728
[45] Dec. 4, 1979

[54] COMBINED AUTOMATIC AND MANUAL GUIDANCE SYSTEM

[75] Inventors: Sven I. A. Otteblad, Partille; Erner T. O. Brynielsson, Borgholm; Ralph G. Dovertie, Göteborg; Stig E. R. Franzén, Västra Frolunda; Hans E. O. Brelén, Skövde, all of Sweden

[73] Assignee: AB Volvo, Goteborg, Sweden

[21] Appl. No.: 779,934

[22] Filed: Mar. 21, 1977

[51] Int. Cl.² .............................................. B62D 1/24
[52] U.S. Cl. .................................... 180/168; 180/79.1
[58] Field of Search ............... 180/146, 98, 79.1, 141, 180/142, 105 R, 105 E, 79

[56] References Cited

U.S. PATENT DOCUMENTS

| 2,331,144 | 10/1943 | Sitter | 180/79.1 |
|---|---|---|---|
| 2,930,247 | 3/1960 | Zinn | 180/79.1 X |
| 2,978,059 | 4/1961 | Miller | 180/105 R |
| 2,990,902 | 7/1961 | Cataldo | 180/142 X |
| 3,029,890 | 4/1962 | Mountjoy | 180/79.1 |
| 3,690,400 | 9/1972 | Uchiyama | 180/142 |
| 3,958,656 | 3/1976 | Niemann | 180/142 X |
| 3,985,195 | 10/1976 | Tixier | 180/98 |

Primary Examiner—Trygve M. Blix
Assistant Examiner—Terrance L. Siemens
Attorney, Agent, or Firm—Young & Thompson

[57] ABSTRACT

A system for combined automatic and manual control of the motion of a vehicle comprises at least one manual control device and automatic equipment with at least one executing device. The executing device is coupled to the manual control device in such a way that a counterforce is generated in the manual control device to the force supplied by the driver. This counterforce is a function of the deviation, produced by the driver, from the intention of the automatic equipment. The automatic equipment is such that, over the whole control range, this counterforce is less than the force that the driver is able to apply on the manual control.

7 Claims, 3 Drawing Figures

COMBINED AUTOMATIC AND MANUAL GUIDANCE SYSTEM

The present invention relates to a system for combined automatic and manual control of the motion of a vehicle.

The purpose of the invention is generally to achieve an automatic auxiliary system which can help a vehicle operator to determine with great precision the stopping position, for example, of the vehicle or accessory, or movement through a critical passage, or speed, or acceleration or change in acceleration (per unit of time). The system is intended, among other things, to be used in buses to guide them into bus stops with high platforms which are level with the floor of the bus since it is practically impossible for a bus driver to routinely drive up to this type of high platform with sufficient precision.

A special purpose of the invention is to achieve a combined system of the above type which can drive the vehicle, without any action by the driver, to a stopping position at the same time as the driver visually watches over the guiding in, and is continually given information by feel about the actions of the automatic system. The driver must be able at all times, and without any extra hand movements, to overpower the automatic guide system. Further, the driver must be able to operate the vehicle himself but using the auxiliary system as an advisory system, this advice being given to the driver by feel rather than visually.

This is achieved according to the invention by the manual control means and the executing means of the automatic equipment being coupled so that (1) a counterforce, static or pulsating, is generated in the manual control means to the force applied by the driver, said counterforce being such a function of the deviation, produced by the driver, from the intentions of the automatic equipment that the driver is able to overpower the counterforce over the entire control range and that (2) the driver is given information about the actions of the automatic equipment by the position of the manual control means.

According to the invention the driver always has the highest authority and can always overpower the automatic equipment. If, for example, an obstacle should appear in front of the vehicle or its accessory, he can brake or steer to one side without difficulty.

According to one special embodiment the automatic equipment has an executing means for controlling the position of the vehicle in the form of an electromechanical torque motor which is coupled to the steering shaft of the vehicle. The interaction is such that the driver's steering torque is weighed against the torque applied by the torque motor, and the resulting torque acts on the normal steering eqipment of the vehicle. The driver can choose between letting the automatic system take over the steering, or steering himself. In this latter case he feels the deviation from the "will" of the auxiliary system by the size and direction of the steering torque he must apply.

For better resolution of this information the countertorque generated to the steering shaft can be modulated (pulsated).

For controlling the speed of the vehicle the automatic equipment can also have an executing means in the form of a pneumatic or hydraulic piston-cylinder device which is coupled to a combined brake and gas pedal. The force which the driver applies to the pedal is weighed against the force from the piston-cylinder device in a manner corresponding to that above.

In the above-mentioned systems for control of position and speed the automatic equipment can be integrated with advantage.

The invention is described below with reference to the enclosed drawings showing embodiments.

Figure 2:
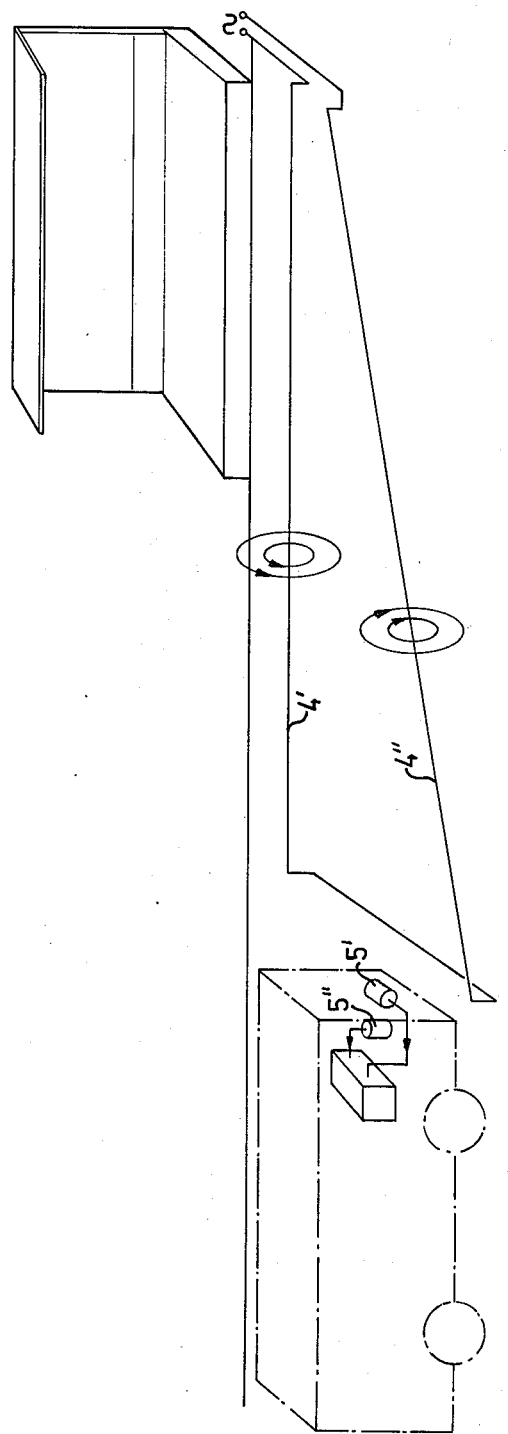
Figure 3:
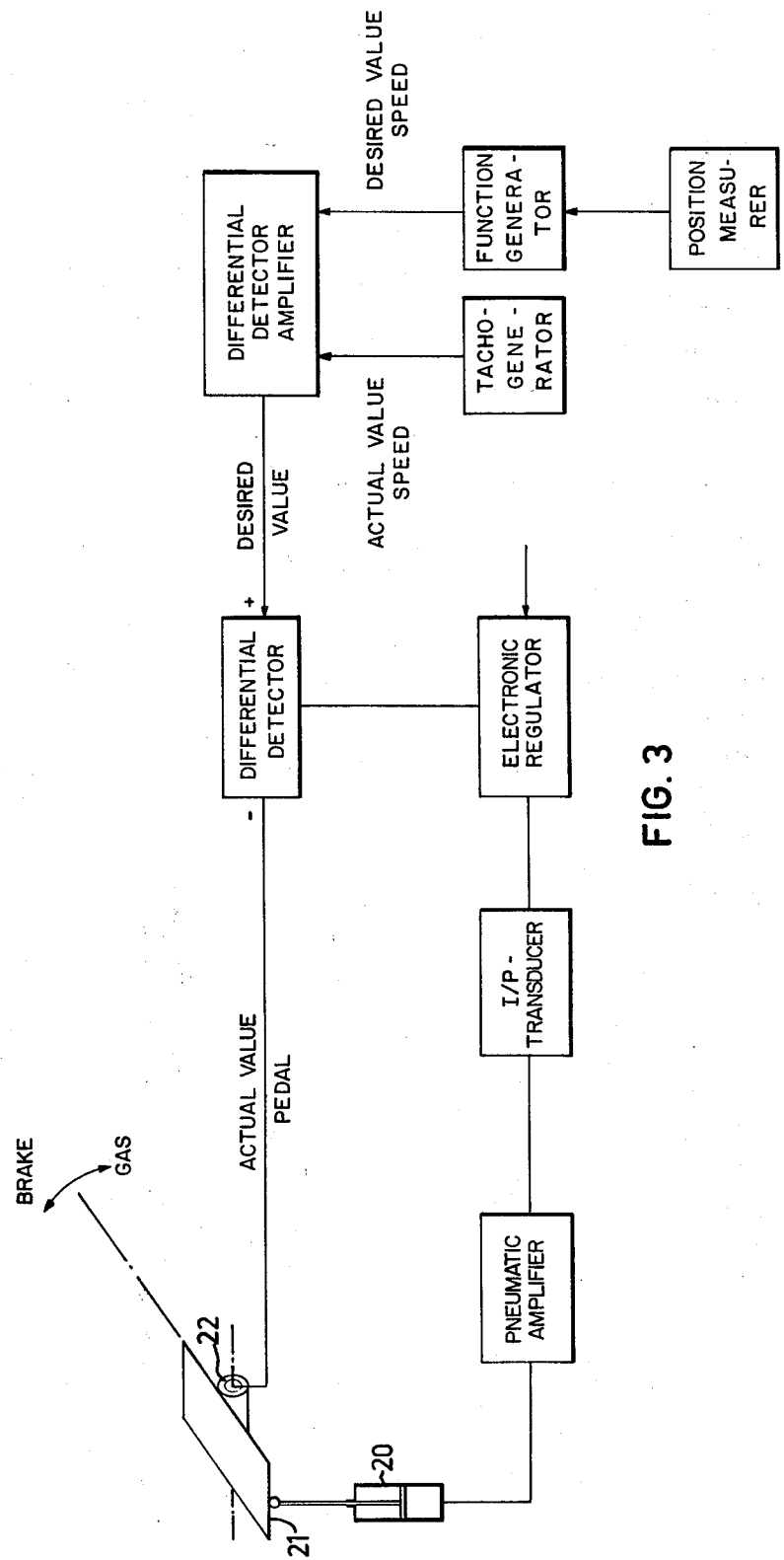

FIG. 1 illustrates schematically a combined automatic and manual system for controlling the position of a bus, FIG. 2 shows a system for controlling the position of the bus and FIG. 3 shows a block diagram of a combined automatic and manual system for controlling the speed of a bus.

The system in FIG. 1, which can be called the lateral guidance system, is designed to help the driver drive the bus up to a bus stop with great lateral precision. This automatic system can be divided into firstly a measuring system for determining the lateral position of the bus, and secondly a system which acts on the steering wheels.

To perform the actual steering of the vehicle a directly driven electromechanical torque motor 1 was choosen which is coupled to the steering wheel 2 via the steering column 2a and acts on the regular hydraulic steering servo unit 3. This construction has the advantage that no intrusion need be made in the components included in the normal manual steering system of the bus, nor do any of these components need to be disengaged for automatic steering. This means that the driver, who visually watches over the automatic steering, can instantaneously intervene and overpower the automatic system without any extra hand movements.

Instead of being a separate unit, the executing means of the automatic system could easily be integrated with the regular steering servo of the bus and they could then use the same energy source.

The measuring system comprises a guide cable 4 which is placed in the road along the desired driving path and which creates a magnetic field. The character of this field, i.e. the position of the bus in relation to the cable, is sensed by measuring coils 5 disposed on the bus. These are connected to a demodulator 6 which, after demodulating the signal from the measuring coils 5, produces an electrical signal which is proportional to the deviation from the desired driving path. In order to be able to control the torque motor 1 with the electrical signal, the signal is fed to a power amplifier 7 which is coupled to the motor 1.

The arrangements described should, in principle, be sufficient to control the wheel position with an electrical signal. However, the output from the torque motor 1 is a steering torque and not a well-defined steering wheel position, and even if this were the case, play and dynamic and static inexactness would result in a relatively uncontrolled angular position of the wheels. Therefore there is a need to check the position of the output shaft 8 of the servo unit 3. For this purpose a potentiometer 9 is connected to the shaft 8 whose position is fed back with the aid of the potentiometer 9 and is compared to the desired position of the wheels (the desired value signal which proceeds from demodulator 6 to amplifier 7). However, it is not the output shaft 8 of the servo unit 3 which is to be ultimately guided to a well-defined position, but the wheel angle itself. Because of, among other things, elasticity in the mechanical transmissions between the servo unit 3 an the wheels 10 there is still inexactness in the wheel position. This is remedied by a potentiometer 12 whichmis connected to the tie rod 11. The potentiometer 12 feeds back the actual wheel position as it is represented by the position of the tie rod between the wheels.

Such great demands can be placed on accuracy in the driving of a bus up to a bus stop with the help of the system described above that the system could become unstable. To assure that the system remains stable even in this case an additional measuring coil 13 is used. This coil 13 senses the direction of the bus in relation to the cable 4. The directional signal causes the system also to oppose angular deviations from the guide cable 4 and thereby acts to stabilize the system.

It has been found that the directional information from the measuring coil 13 reduces the ability to exactly follow the guide cable at low speeds, and this information should therefore be removed over the last distance before the stop position of the bus, since at that point there are accuracy requirements on the order of centimeters. For that reason the system's demodulator is adapted to vary the directional and positional amplification, that is to say vary the degree of consideration given to the directional and positional errors. The directional amplification is greatest at the beginning of the cable and drops essentially linearly to practically 0 right before the stopping position. The positional amplification is lowest, for example about 20% of the maximum amplification, at the beginning of the cable and increases essentially linearly to the maximum right before the stopping position.

Finally the described system can include a steering torque transducer 14, connected to the steering shaft, which senses the manual steering torque and which modifies (weakens, modulates) the torque applied by the automatic system at increasing manual torque.

FIG. 2 shows an alternative system for measuring the position of the bus, consisting of two guide cables 4', 4" placed in the road at a distnace from one another and a pair of coils 5', 5". The guide cables 4', 4" form a loop together which is connected to a source of alternating current. Gradually reducing the distance between the guide cables increases the "amplification" of the positional error measured by the coils. Suitably the axis of one coil 5' is parallel to the wheel axles, while the axis of the other coil 5" is vertical. The first coil 5' senses the amplitude of the magnetic field horizontally. Both of the coils must be used however to determined the direction of the magnetic field.

FIG. 3 shows a combined automatic and manual system for controlling the speed of a vehicle.

The system, which can be called the longitudinal guidance system, has the task of producing a comfortable braking pattern ending with a stop at a position defined with a certain precision. To carry out this speed control a pneumatic piston-cylinder device 20 is connected to a combined gas and brake pedal 21 which is coupled (not shown in detail here) to the regular system of the bus for regulating gas flow and braking. The pedal 21 is only shown schematically. As with the lateral system described above this construction does not require any major intrusions into the components included in the normal system of speed regulation; nor is manual switching required between automatic and manual control. The driver monitors the automatic system by feel and can at any time intervene and overpower the automatic system.

As is shown in the block diagram in FIG. 3 the system includes a position measurer which measures the position of the bus relative to the stopping position, for example by detecting a signal sent from the cable or detecting the passage of local magnetic fields in the road along the braking distance.

The measured position is generated in a function generator into the speed at which the bus should be moving considering the remaining distance to the stopping position. At the same time a tachometer-generator for example measures the actual speed which, in a regulator with a differential detector and amplifier, is compared to the desired speed, and an output signal is generated which represents a desired value for the setting of the pedal 21. This desired value signal is compared in a differential detector with a signal representing the actual setting of the pedal 21 and which is obtained from a potentiometer 22 coupled to the pedal. The difference signal is treated in an electronic regulator whose output signal is transferred into air pressure in an I/P transducer. The air pressure is amplified to the appropriate pressure in a pneumatic amplifier to adjust the piston-cylinder device 20, and thereby the pedal 21, in relation to the difference between the actual speed of the bus and its desired speed considering the distance to the stopping position. If the actual speed is greater than the desired speed, the piston-cylinder device 20 will adjust the pedal 21 in relation to this difference so that the brakes are engaged and the speed of the bus is reduced until the speed difference is essentially zero.

This system for controlling the speed can also be advisory and dependent on prevailing speed regulations.

The system according to the invention can also be made advisory as regards acceleration (depending on the maximum allowable or desired force stresses, both longitudinal and lateral) or changes in acceleration (depending on how quickly a passenger is able to react to occurring forces).

The invention can also be used for guidance of accessories coupled to the vehicle, e.g. loaders (transporting standard pallets into warehouses) or tractor accessories (in forestry or agriculture).

What we claim is:

1. A system for combined automatic and manual steering of a vehicle, comprising at least one manual steering means and an automatic equipment with at least one executing means, said executing means being coupled to said manual steering means such that a counterforce is generated in said manual steering means to the force applied by the driver, said counterforce being a function of the deviation, produced by the driver, from a steered path of said vehicle as predetermined by said automatic equipment, said automatic equipment being such that over the whole steering range, said counterforce is less than the force that the driver is able to apply on said manual steering means.

2. A system according to claim 1, characterized in that the automatic equipment has an executing means in the form of a torque motor (1) which is coupled to the steering shaft (2a) of the vehicle.

3. A system according to claim 1, characterized in that the executing means of the automatic equipment is integrated with a steering servo motor which also serves the manual steering means.

4. A system according to claim 1, characterized in that the automatic equipment comprises at least one guide cable (4) running along the intended driving path, which cable produces a magnetic field, and at least one measuring coil (5,13) disposed on the vehicle which senses the magnetic field and controls the executing means (1) via a demodulator (6) and an amplifier (7).

5. A system according to claim 4, characterized in that the automatic equipment comprises a guide cable (4), two cooperating measuring coils (5) which sense the position of the vehicle relative to the guide cable (4) and a measuring coil (13) which senses the direction of the vehicle relative to the guide cable (4).

6. A system according to claim 4, characterized in that the automatic equipment comprises two guide cables (4',4") placed at a distance from one another and two measuring coils (5',5") which sense the positional error of the vehicle and, with varying amplification, control the executing means, said amplification being varied by varying the distance between the guide cables.

7. A system according to any one of the claim 1, characterized in that the automatic equipment comprises a torque transducer (14) which senses the manual torque and modifies the torque applied by the executing means (1) of the automatic equipment, with increasing manual torque.

* * * * *